Figure 1:
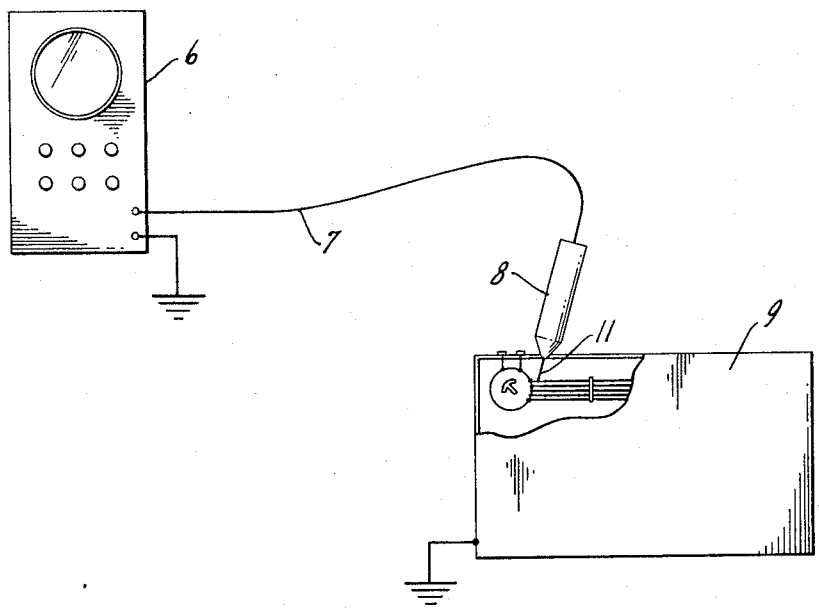

Jan. 3, 1967  V. B. CONES  3,296,527
DIRECT MEASUREMENT PROBE FOR RADIO FREQUENCY ENERGY
Filed April 12, 1962

INVENTOR.
Van B. Cones,
BY
H. H. Loscke
Att'ys.

3,296,527
DIRECT MEASUREMENT PROBE FOR RADIO FREQUENCY ENERGY
Van B. Cones, Indianapolis, Ind., assignor to the United States of America as represented by the Secretary of the Navy
Filed Apr. 12, 1962, Ser. No. 187,138
2 Claims. (Cl. 324—72.5)

The invention described herein may be manufactured and used by or for the Government of the United States of America for governmental purposes without the payment of any royalties thereon or therefor.

The present invention relates generally to electrical measuring equipment and more specifically to a device for enabling direct conduction measurement of alternating current voltages over an extremely wide frequency range.

One of the most critical problems confronting designers of high frequency electronics equipment has been the location and elimination of sources of radio frequency interference (RFI) in such equipment. This interference may be created by many varied sources, both internal and external, and its presence is extremely objectionable in conductors intended for carrying direct current (D.C.) voltages or low frequency alternating current (A.C.) voltages. This RFI voltage is superimposed upon the desired D.C. or low frequency A.C. voltages and unless the amount and source of this type of interference can be determined and reduced or eliminated, as required, the effectiveness of the concerned equipment will be considerably diminished, if not completely destroyed. In the past, measurement and location of sources of RFI have been performed by devices utilizing the principles of induction such as magnetic loops and RF current probes, or radiation such as antenna receiving systems. These devices have proven unreliable in several ways, one being that where conductors are bundled or placed in close proximity with one another, it is extremely difficult if not impossible to ascertain by means of these prior art devices which of the individual conductors is carrying or is responsible for the RFI present in the equipment. This is because both induction and radiation devices merely give a relative indication of the RFI in a general area and thus cannot distinguish between individual conductors closely grouped.

The present invention, however, overcomes this difficulty by providing a means to enable direct conduction measurement of the RFI present in each of such conductors on an individual basis, this permitting determination of the individual conductor or conductors carrying undesired RF signals, thereby enabling the source of such undesired signals to be located much more rapidly and accurately than was previously possible. This enables a considerable saving of time and man-hours in locating sources of RFI in complex electronics equipment resulting in improved performance, and increased production and/or financial savings on such equipment.

An object of the present invention is the provision of a device to enable measurement of radio frequency signals.

Another object is to provide a device to enable direct conduction measurement of radio frequency signals.

A further object of the invention is the provision of an economical and compact measurement probe capable of enabling direct conduction measurement of radio frequency energy.

Still another object is to provide a measurement probe to enable direct conduction measurement of radio frequency energy in the presence of direct current or low frequency alternating current energy without interference therefrom.

Yet another object of the present invention is the provision of a direct conduction, radio frequency voltage measurement probe to facilitate location of sources of radio frequency interference in complex electronics equipment.

A still further object is to provide a low cost direct conduction radio frequency voltage measuring probe operable into the kilomegacycle region and remaining unaffected by stray fields which cause erroneous indications in inductive probes of the prior art.

Figure 2:
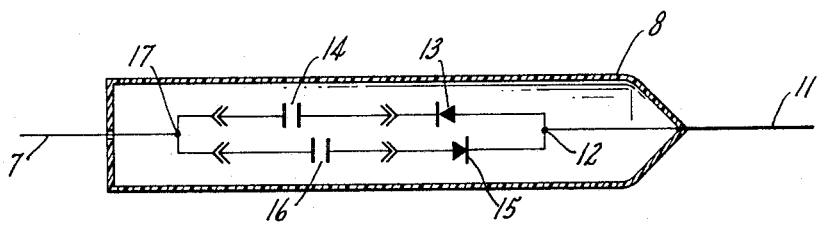

Other objects and features of the invention will become apparent to those skilled in the art as the disclosure is revealed in the following detailed description of a preferred embodiment of the invention as illustrated in the accompanying sheet of drawings in which:

FIGURE 1 shows the invention being utilized to obtain RF energy readings of equipment under test, and FIGURE 2 is a schematic-pictorial diagram of a preferred embodiment of the invention.

Referring now to the drawing, wherein like reference characters designate like or corresponding parts throughout the various views, there is shown in FIGURE 1 an RF indicating instrument 6 which may be an RF voltmeter, an oscilloscope, a noise and field intensity meter (such as Model NF–105 of Empire Devices Products Corporation), or any other suitable RF indicating means. A conductor 7 couples indicating means 6 to the invention, a direct conduction RF measurement probe 8, which is shown in detail in FIGURE 2. Probe 8 is being utilized to make direct RFI measurements on a bundle of conductors in the underchassis of a piece of electronics equipment 9.

FIGURE 2 shows a schematic diagram of a preferred embodiment of the invention in which a conducting tip 11 of probe 8 is coupled to an input terminal point 12 of a network composed of a diode 13 in series with a capacitance 14 which combination is, in turn, placed in parallel with the combination of a diode 15, polarized in a direction opposite to that of diode 13, in series with a capicitance 16, this network being coupled at terminal point 17 to conductor 7 which is further coupled to a utilization device such as element 6 in FIGURE 1. Diodes 13 and 15 may be of any general purpose type, such as silicon, germanium, or other common material; and capacitances 14 and 16 may be of any general value such that they present a sizeable impedance or blocking effect to signals at frequencies lower than the desired RF signals to be measured. The probe may be made adaptable to varied individual applications by making capacitances 14 and 16 pluggable as shown in FIGURE 2 and inserting capacitances having desired values for a particular application.

*Operation*

In operation, the probe is utilized to make direct conduction measurements of RF signals even though such signals are found to be superimposed upon direct current or low frequency alternating current signals, without interference with, or erroneous indication from, these low frequency signals. In FIGURE 1 probe 8 is being utilized, in conjunction with RF indicating means 6, to make individual direct conduction measurements of RF energy in each conductor of a bundle of conductors in the underchassis of an operating unit of electronics equipment 9 by successively placing the probe at a termination point of each of the wires. Any RF energy present at such termination points will be conducted by probe 8 to indicating means 6, and any direct current or relatively low frequency (for example, 400 cycles/second) signals present in the conductors will not affect the indication of higher frequency energy in the form of RFI being measured.

The invention enables such direct conduction measurements of RF energy to be made without interference from lower frequency energy because capacitors 14 and 16 (see FIG. 2) appear as open circuits to direct current energy and are chosen so as to present extremely high blocking impedances to relatively low frequency energy; thus it can be seen that energy of this type will not be conducted by the invention, probe 8, to indicating means 6 and therefore cannot interfere with any energy which is conducted thereto. Energy in the RF region, however, which it is desired to measure is conducted by probe 8 in the following manner. Assuming capacitors 14 and 16 to be initially discharged, when tip 11 of probe 8 is placed in contact with a conductor of RF energy, positive half cycles of this RF voltage will be passed by diode 13 and applied to capacitance 14 and the negative half cycles thereof will be passed by diode 15 and applied to capacitance 16. Capacitors 14 and 16 will, after a few half cycles of this RF voltage, become charged to opposite D.C. polarities by diodes 13 and 15, respectively. Positive RF energy is then coupled from tip 11 of probe 8 via diode 13 and capacitance 14 to indicating instrument 6, while on alternate half cycles negative RF energy is coupled from tip 11 via diode 15 and capacitance 16 to indicating instrument 6. Thus it can be seen that entire cycles of RF energy present in a conductor under test are presented to indicating means 6 for evaluation, while any D.C. or low frequency A.C. energy present therein is "blocked" or prevented from reaching the indicating means by probe 8.

It therefore becomes apparent from the foregoing description and annexed drawing that the invention, a radio frequency direct measurement probe, is a useful and practical device having many applications in the field of electrical measurements. The usefulness of this probe is enhanced by its versatility, reliability, and economy of initial construction.

Obviously many modifications and variations of the present invention are possible in the light of the above teachings. It is therefore to be understood, that within the scope of the appended claims, the invention may be practiced otherwise than as specifically described.

I claim:

1. A means for enabling direct conduction measurement of electrical radio frequency energy in the presence of lower frequency energy without interference therefrom or therewith comprising:

a conducting tip for contacting points where measurement of radio frequency energy is desired;

a nonconducting hollow body to which said conducting tip is attached; and an electrical limiting means for permitting passage of electrical radio frequency energy while blocking passage of lower frequency electrical energy having an input terminal coupled to said conducting tip, and an output terminal for providing electrical radio frequency energy to a measurement device, said electrical limiting means including a first combination of a rectifying means coupled in series with a capacitance means, and a second combination of a rectifying means, polarized oppositely to said rectifying means in said first combination, in series with a capacitance means, said first and second combinations being coupled in parallel and having said input terminal connected to a first common junction of said first and second combinations, and said output terminal connected to the other common junction of said first and second combinations, said electrical limiting means being located within said nonconducting hollow body.

2. A probe for enabling direct conduction measurement of radio frequency energy comprising:

a conducting tip for contacting points where measurement of radio frequency energy is desired;

a nonconducting hollow body to which said conducting tip is attached; and an electrical network within said hollow body having an input terminal coupled to said conducting tip and an output terminal coupled to a radio frequency energy level indicating means, said electrical network having a first combination of a rectifying means in series with a first capacitance and a second combination of a rectifying means oppositely polarized to said rectifying means of said first combination in series with a second capacitance, said first combination and said second combination being coupled, in parallel with one another, between said input and output terminals.

References Cited by the Examiner

UNITED STATES PATENTS 2,883,619   4/1959   Kobbe et al. _____ 324—149 X

OTHER REFERENCES

Sherman: Article entitled "Probes for Profits," pp. 96, 97 of Radio-Electronics for March 1955.

WALTER L. CARLSON, *Primary Examiner.*

E. L. STOLARUN, *Assistant Examiner.*